United States Patent [19]
Canfield

[11] Patent Number: 5,515,617
[45] Date of Patent: May 14, 1996

[54] MEASURING, MARKING, AND CUTTING TOOL

[76] Inventor: Gerald Canfield, 1975 Wiltshire Ave., Akron, Ohio 44313

[21] Appl. No.: 368,091

[22] Filed: Jan. 3, 1995

[51] Int. Cl.$^6$ .............................. G01B 3/10; B43L 13/04
[52] U.S. Cl. .................. 33/768; 33/42; 33/770; 33/668
[58] Field of Search ................ 33/768, 41.6, 42, 33/755, 758, 759, 760, 761, 767, 770, 668

[56] References Cited

U.S. PATENT DOCUMENTS

| | | | |
|---|---|---|---|
| 1,598,993 | 9/1926 | Vlazny | 33/42 |
| 4,856,726 | 8/1989 | Kang | 33/767 |
| 4,890,393 | 1/1990 | St. Jean | 33/768 |
| 4,914,830 | 4/1990 | Legaré | 33/668 |
| 5,197,195 | 3/1993 | Aikens | 33/42 |
| 5,295,308 | 3/1994 | Stevens et al. | 33/770 |
| 5,349,760 | 9/1994 | DeVito | 33/760 |
| 5,406,711 | 4/1995 | Graham | 33/42 |
| 5,421,100 | 6/1995 | Leore | 33/758 |

*Primary Examiner*—Christopher W. Fulton
*Attorney, Agent, or Firm*—John D. Gugliotta

[57] ABSTRACT

An improved measuring, marking, and cutting tool comprising a tape measuring device within a housing which contains a guide and brake, and a pencil/knife holding attachment affixed to the distal end of the extensible, flexible measuring tape. The guide is a rigid, straight structure running along the bottom of the housing, and provides for a method of smoothly following along the straight edge of a workpiece, thereby facilitating long, straight, perpendicular marks or cuts. The brake mechanism is engaged by the guide structure, allowing the user to engage the brake and fix the measuring length of the tape by merely pushing down on the housing. The pencil/knife holding attachment is comprised of two Velcro (™) straps that can be wrapped around and affixed to a standard pen, pencil, utility knife, and the like.

4 Claims, 7 Drawing Sheets

MEASURING, MARKING, AND CUTTING TOOL

FIELD OF THE INVENTION

This invention relates to a tape measuring device, and more specifically to an improved tape measuring device that can be utilized to measure, mark, or cut. It is particularly useful in the building trades, especially in the fields of dry wall and carpentry where a craftsman is required to make long, straight, parallel marks or cuts.

BACKGROUND OF THE INVENTION

Currently, there are numerous devices available to those in the building trades which can perform measuring functions. From a simple wooden stick with marked graduations, to a retractable steel graduated tape coil, these devices perform adequately the rather mundane task of measuring. These devices have been available for many years, with gradual improvements made to accommodate ease of use. The present invention relates to a device specifically designed to accommodate the act of measuring with the acts of marking or cutting. The present invention also relates especially to a device design to accommodate the act of measuring with the acts of marking or cutting long straight lines or edges where normally several tools and multiple steps are required to perform the identical overall tasks. Specifically, the present invention relates to a coiled, spring return, reversible, and lockable flexible measuring tape housed in a convenient hand held housing, said housing integrating a two sided guide edge, and said measuring tape accommodating an attachment clip and holder device for attachment to a standard utility knife, pencil, or other marking device.

Recently, a number of inventions have been developed to accommodate the act of measuring with the need to mark and/or cut an object at any particular measured point. For example, the prior art includes U.S. Pat. No. 4,914,830 to Legare, U.S. Pat. No. 5,295,308 to Stevens et al., and U.S. Pat. No. 5,349,760 to DeVito.

In the Legare invention (4,914,830), a tape measuring device is described that includes a fixture for holding a pencil or other marking utensil. The preferred embodiment of the Legare invention is in essence a standard steel coil graduated tape measure with an improvement that allows the measuring and marking function to be performed simultaneously by the craftsman user. At its simplest, the Legare invention is a device that holds a pencil to a tape measure in a very clever manner.

Further improvements in this particular field with the Sevens et al. invention (5,295,308). In Stevens et al., a tool similar to that of Legare provided for reduced friction, allowing for easy sliding over a work surface, plus a handle on the distal end to provide a better gripping surface. Also, the Stevens et al. invention added a blade holding assembly that then allows for the simultaneous measuring and cutting, thereby eliminating the marking step altogether.

Finally, in the DeVito patent (5,349,760), improvements were made in the method of guiding the tool along a reference edge by adding a guiding structure, as well as an improved blade holding assembly that allows for easy use with standard and readily available utility knife blades.

There are a number of disadvantages to all of these approaches taken in the prior art. As experienced in practice, true one-hand operation is impractical due to the need to hold both ends of any measuring device to insure precision. And, although proceeding directly from measuring to cutting may increase speed due to the elimination of a marking step, in some cases the user may wish to utilize either the marking or the cutting functions, or a combination throughout the course of the user's work. And, a major drawback in the prior art is a built-in inflexibility to reversibility, i.e. these tools do not perform with equal ease when utilized in 'right handed' or 'left handed' operation. Also, perhaps the biggest deficiency of all in the prior art is that the cutting or marking mechanisms are heavy, bulky, and without the adequate support required to mark or cut straight lines. Although efforts toward reducing friction have been attempted to solve this last problem, the source of the problem appears to lie more in gravity than in friction, and is caused by the inherent instability generated by having the cutting or marking mechanism attached to the measuring coil housing, thereby combining both the weight and bulk of both parts.

These and other difficulties experienced in the practical utilization of the prior art have been overcome by the present invention in a novel and nonobvious manner. It is a primary object of the present invention to provide for the accurate measuring, marking, and/or cutting of workpieces. It is also a major object of the present invention to provide for easy measuring, marking, and/or cutting of workpieces.

Another object of the present invention is to provide for easy reversibility of work edges or marking/cutting edges.

Another object of the present invention is to provide for easy integration with existing marking and cutting tools currently available and in wide practical use.

BRIEF SUMMARY OF THE INVENTION

A measuring, marking, and cutting tool is provided that has a flexible, two sided marked flexible measuring tape that can be utilized for accurate measuring on either side. The measuring, marking and cutting tool houses said two sided marked measuring tape in a hand gripable housing. The tape itself is coiled and under tension of a spring mechanism to allow for retraction of the tape into a coiled storage position within the housing. The housing has a centered, slotted window to allow for tape extraction outward from said housing.

The housing itself must also contain a guide feature as well as a tape brake mechanism. The guide feature will provide a straight reference edge on either side of the handle to allow for contact with and/or movement along the reference edge of any workpiece. The tape brake mechanism will provide a means of fixing the position of the measuring tape, and must therefore overcome the tension provided by the spring mechanism used for retraction as well as reasonable pulling forces exerted by normal use of the tool. This tape brake mechanism can be activated by hand engagement, or can be engaged by contact with a workpiece surface adjacent to the workpiece reference edge.

Another aspect of the invention involves the attachment mechanism located integral to the distal end of the flexible marked measuring tape. This attachment mechanism will allow for the attachment and detachment of marking or cutting devices. In particular, this attachment mechanism will allow for the easy attachment and detachment of a standard and widely available 'utility cutting knife' by providing a clip retaining an adjustable holder that can be attached to a user's existing cutting devices, or alternatively with a standard marking device such as a pencil or pen.

BRIEF DESCRIPTION OF THE DRAWINGS

And finally.

DETAILED DESCRIPTION OF THE PREFERRED EMBODIMENT

Figure 1:
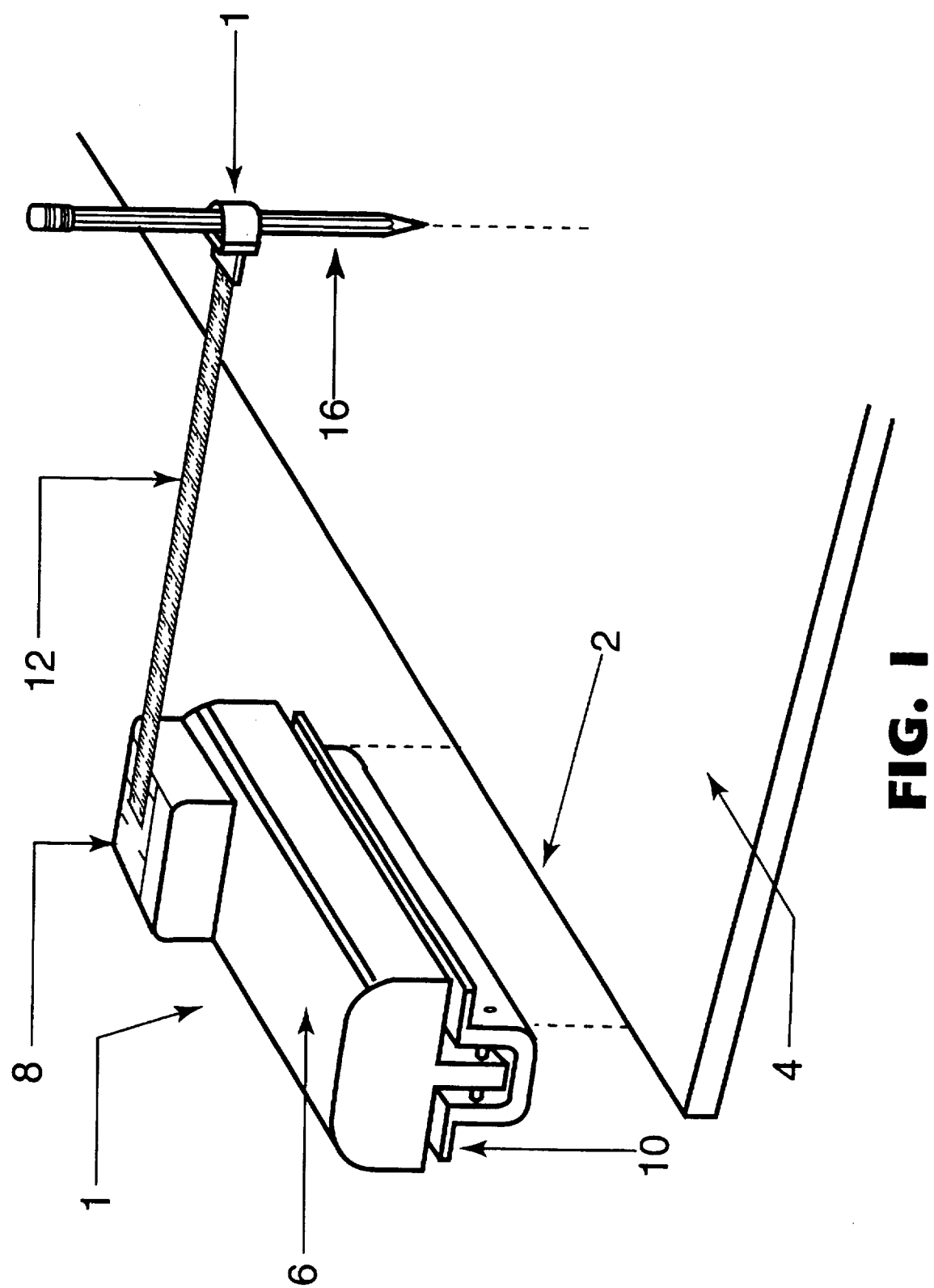
FIG. 1 is an orthographic view of a measuring, marking, and cutting tool according to the present invention.

FIG. 1 depicts an orthographic view of a measuring, marking and cutting tool, generally referred to as 1, used in a typical application to measure and mark a line parallel to a straight edge 2 of a workpiece 4. The measuring, marking, and cutting tool comprises a housing 6 and a tape cartridge 8, which supports a guide 10. The tape cartridge 8, which will be described in further detail below, houses a retractable tape 12, said tape 12 terminating in a clip 14. In the current display of the embodiment, a pencil 16 is held by the clip 14 for use in marking the workpiece 4. In its preferred embodiment, the tape 12 is a flexible but sturdy material, such as cloth, plastic impregnated cloth, or the like.

Figure 2A:
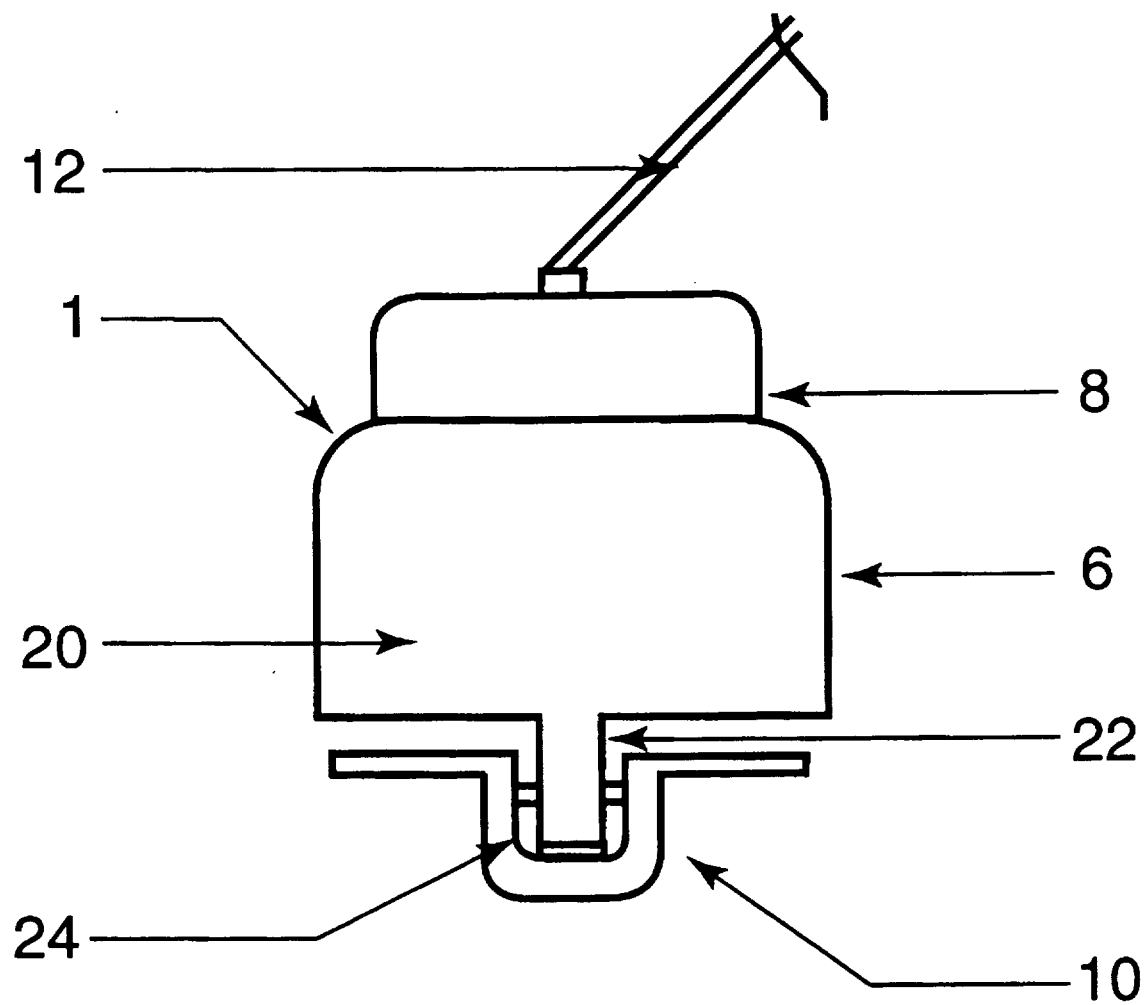
FIG. 2A is an end view of a measuring, marking and cutting tool according to the present invention.

In FIG. 2A, an end view of the measuring, marking and cutting tool 1, the housing 6 is composed of a generally compact and contiguous body 20 with a protruded but integrated foot 22, and is shaped such as to accommodate the insertion of the tape cartridge 8, which contains the tape 12. The foot 22 inserts into and holds the guide 10, which is held onto said foot via a plurality of guide retaining pins 24. The details of this attachment, as well as the accommodation of the tape cartridge will be more thoroughly described below.

Figure 2B:
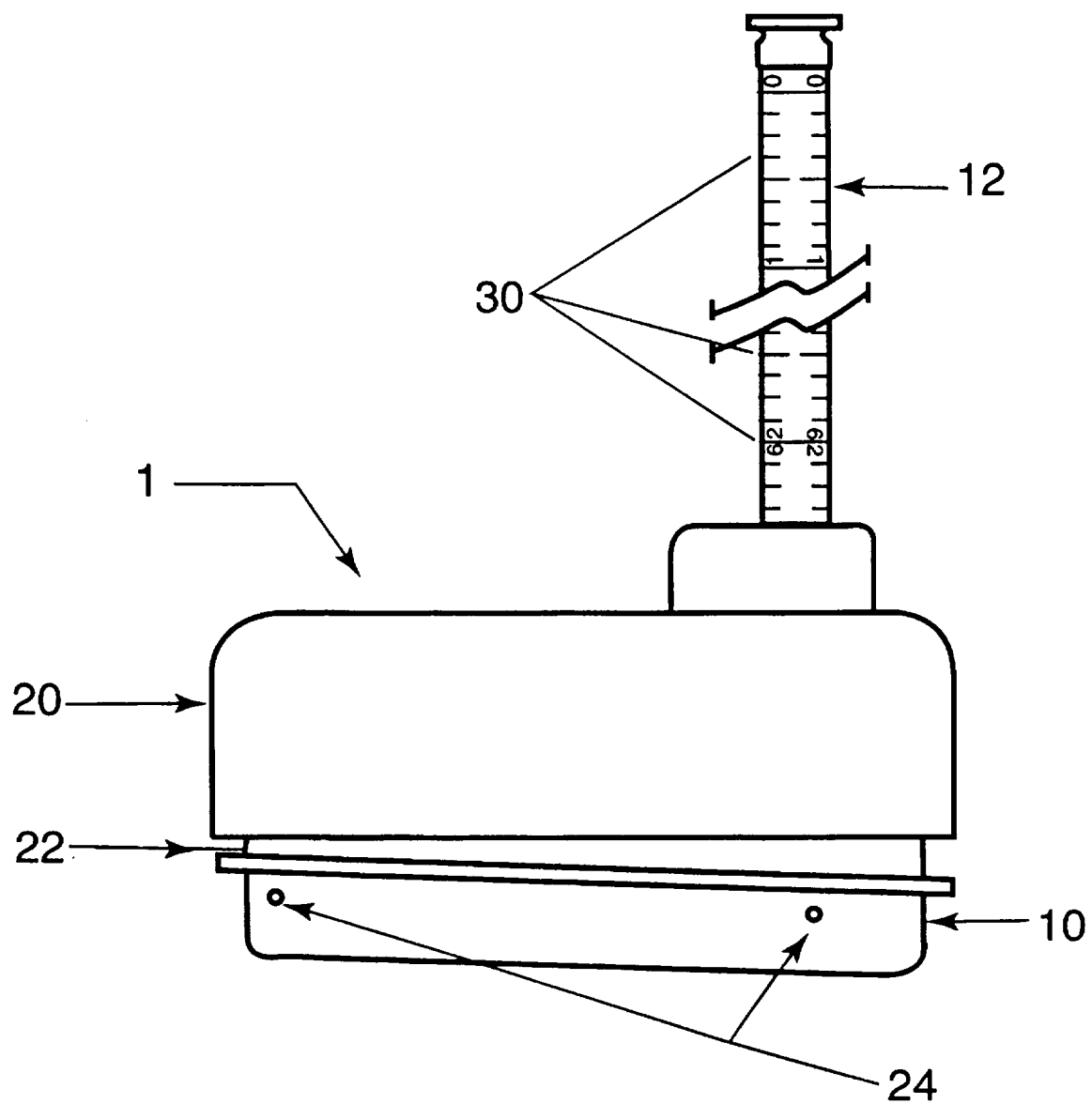
FIG. 2B is a side view of a measuring, marking, and cutting tool according to the present invention.
Figure 3:
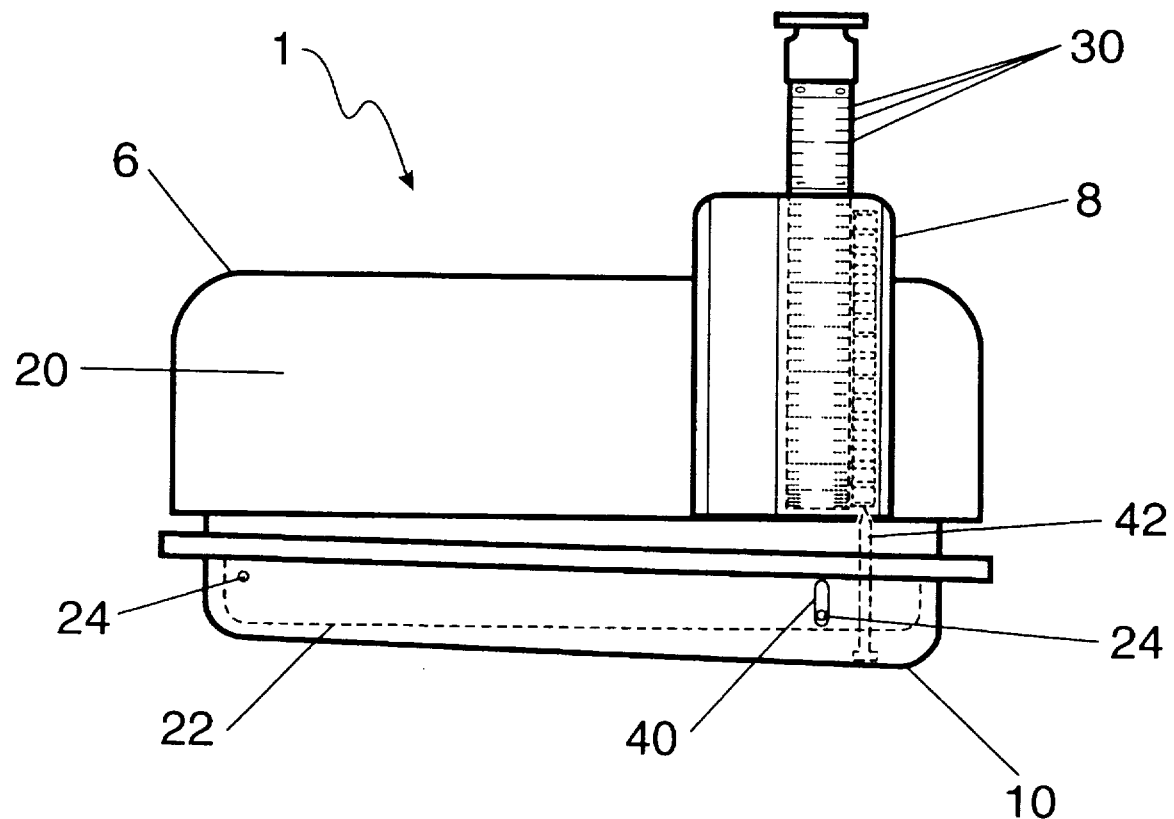
FIG. 3 is a cutaway side view of a measuring, marking, and cutting tool according to the present invention, depicting in detail the attachment of the guide on the foot.

FIG. 2B and FIG. 3 both show the same measuring, marking, and cutting tool 1 from a side view. Both figures once again show the housing 6 composed of a body 20 with a protruded but integrated foot 22, and shaped such that body 20 can accommodate the insertion of and hold a tape cartridge 8. The foot 22, inserting into the guide 10 is encompassed by said guide, with the retaining pins 24 providing the means of securing said guide to said foot. In further detail, the tape 12 shows a series of regularly intervalled graduations 30 used for measuring, said graduations 30 being marked and located on both sides of tape 12.

FIG. 3 is an cutaway side view of a measuring, marking, and cutting tool according to the present invention, depicting also in greater detail the attachment of the guide on the foot. Of particular importance is the attachment of one guide retaining pin 24 as a pivot, and all other guide retaining pins 24 passing through a guide retaining pin slot 40, positioned in the foot 22 and shaped to allow the guide 10 to pivot, thereby engaging brake pin 42 into the tape cartridge 8, which will be described in further detail below.

Figure 4:
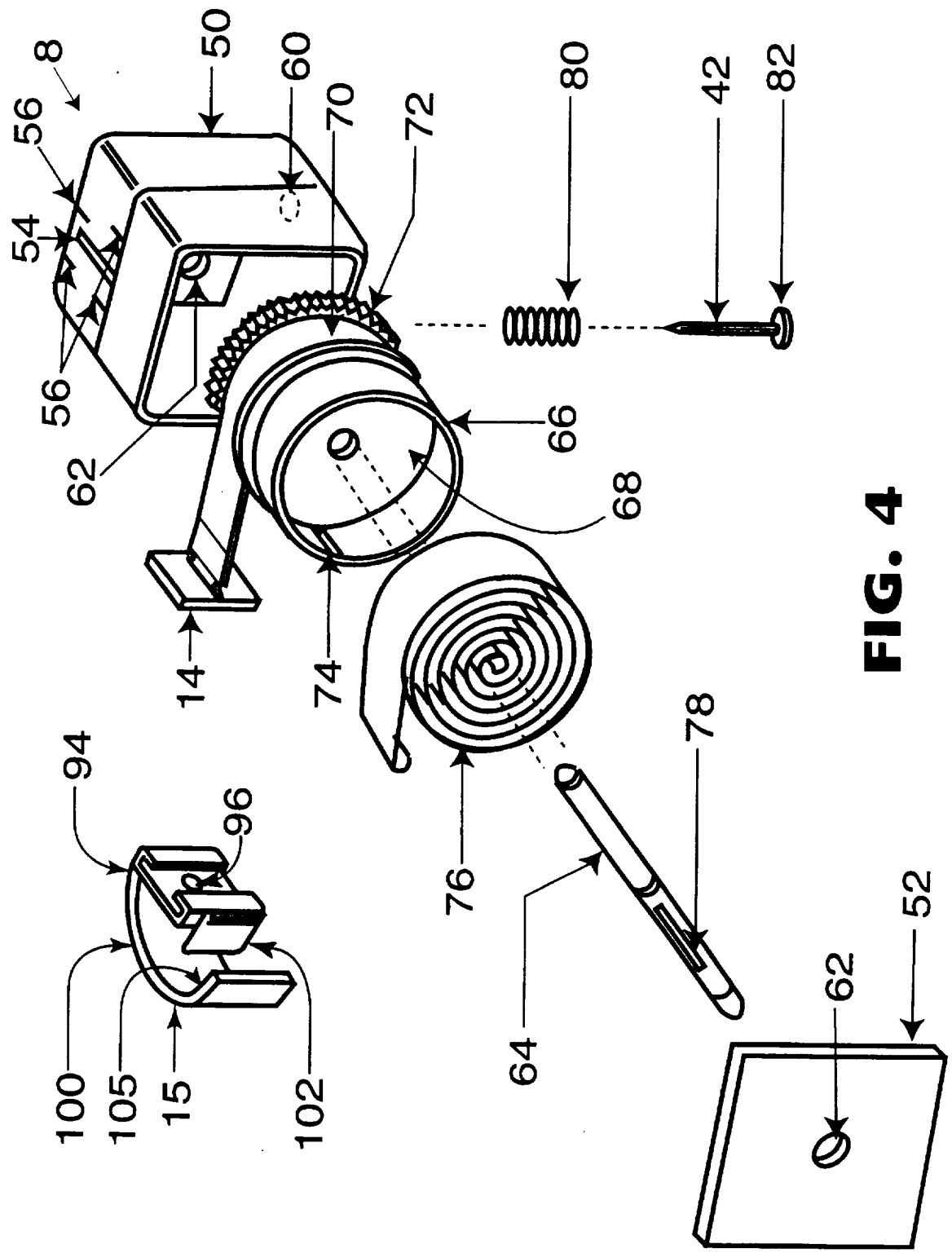
FIG. 4 is an exploded orthographic view of a tape cartridge showing its internal assembly details.

In FIG. 4, the internal details of the tape cartridge are depicted in an exploded orthographic view. The tape cartridge 8 itself consists of a box 50 which encases the other components and is covered by and attached with a cover 52. The box 50 has a tape receiving slot 54 through which the tape 12 passes through said box 50. Proximately located near and on either side of the tape receiving slot 54 are a plurality of reference marks 56. According to the preferred embodiment of the current invention it is envisioned that a number of different size marking or cutting tools may be utilized. Therefore, a need is foreseen for at least two reference marks 56 on either side of the tape receiving slot 54. On each side of the tape receiving slot 54, one reference mark 56 will be for use with a cutting device, the other will be for use with a marking device.

Further, the box 50 will have a brake pin access hole 60 (shown hidden in this view), to allow for free passage of the brake pin 42 through and into the box 50. Also, the box 50 and cover 52 each have an aligned axle attachment point 62 to hold and secure an axle 64. The axle 64 supports a freely rotating drum 66 which comprises the features of a spring coil cavity 68, a tape spool 70, detentes 72, and a drum spring slot 74. The spring coil cavity 68 contains a spring 76, which is coiled and housed within the spring coil cavity with one end passing through and secured to the drum spring slot 74. In a similar manner, the other end of the spring 76 passes through and is affixed to the axle spring slot 78. The tape 12 is terminally attached to the tape spool 70, and wound within it when assembled. When the tape 12 is extended, drum 66 spins and the spring 76 provides a return tension for retracting the tape 12. The detentes 72 provide a locking means when the brake pin 42 is engaged between two consecutive detentes 72. It is therefore important that the brake pin access hole 60 align directly beneath the edge of the drum that comprises the detentes 72. A brake return spring 80 mounts around the brake pin 42, and provides the brake disengaging force by providing tension between the box 50 and a spring retaining head 82, which is a flattened disc-shaped structure on one end of the brake pin 42.

Figure 5:
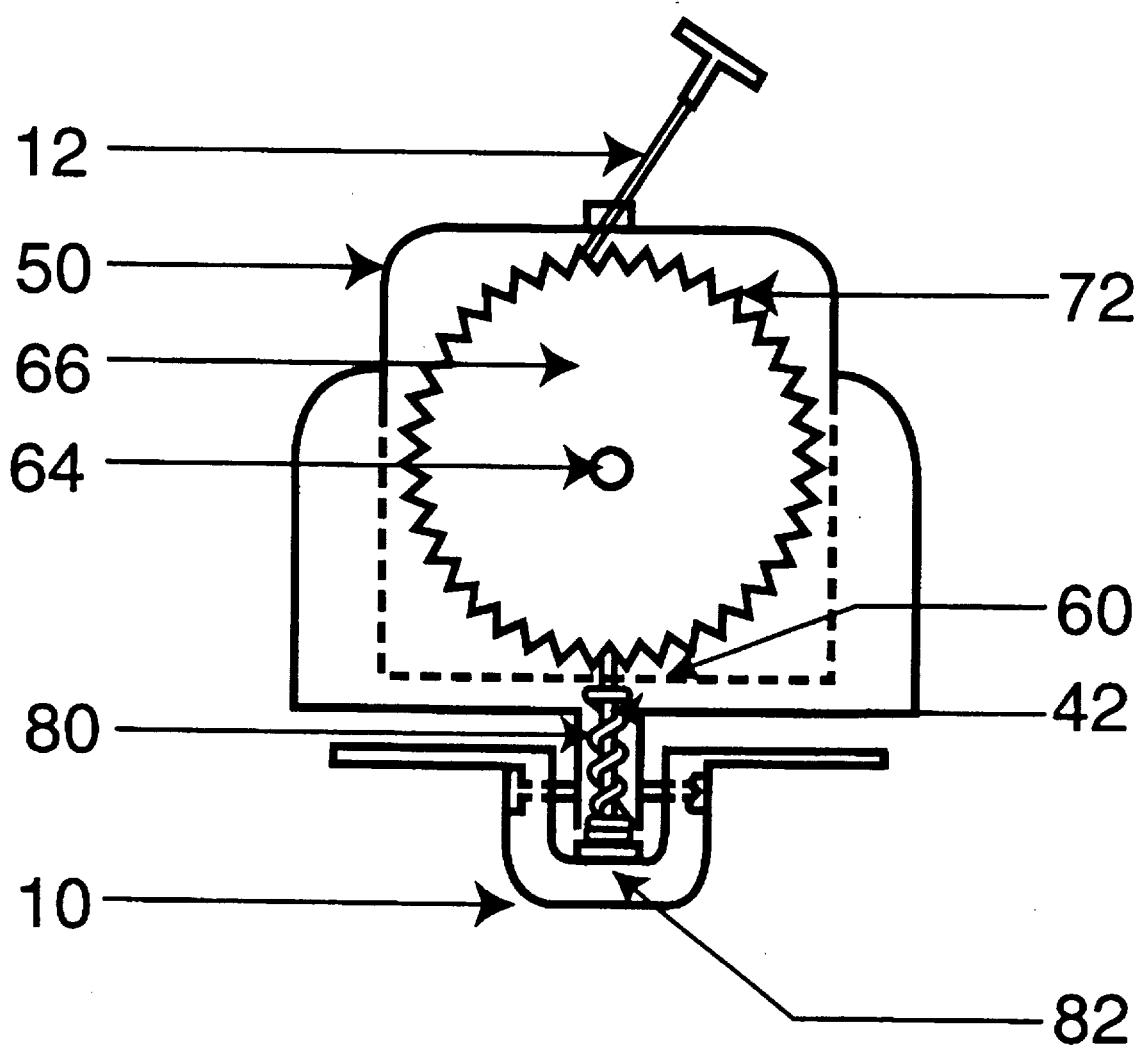
FIG. 5 depicts a cutaway end view of a measuring, marking and cutting tool according to the present invention.

The brake engagement is shown in greater detail in FIG. 5, which depicts a cutaway end view of a measuring, marking and cutting tool according to the present invention. As is shown, the drum 66 is rotatably supported by the axle 64, and has detentes 72 on one end. The brake pin 42 is engaged when guide 10 is depressed, forcing the brake pin 42 to resist the tension created by the brake return spring 80 pushing between the box 50 and the spring retaining head 82. The brake pin 42 thereby passes through the brake pin access hole 60 and wedges between two adjacent detentes 72, thereby impinging against the lateral sides thereof and causing the tape 12 to be locked at the desired measurement location.

Figure 6:
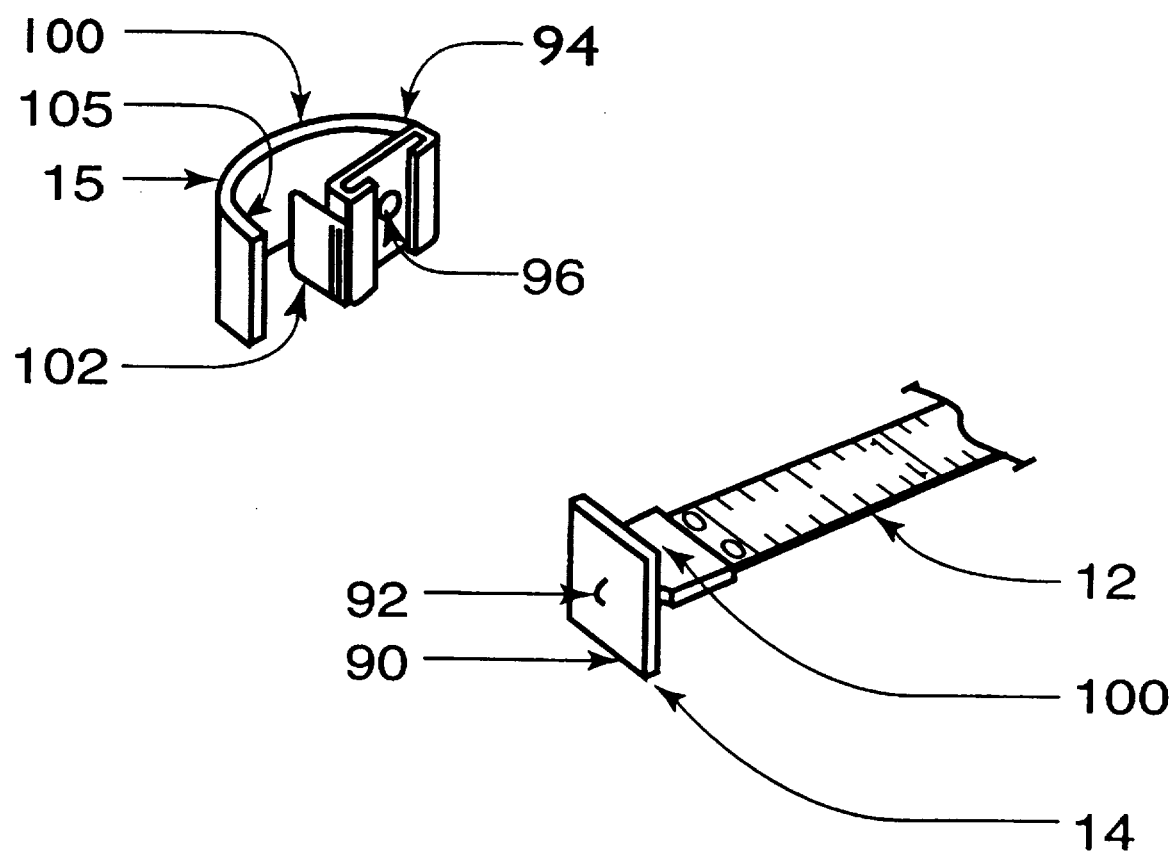
FIG. 6 is an orthographic view of a hook and tool clamping means that is part of a measuring, marking, and cutting tool according to the present invention.

Finally, the means of attaching a marking or cutting device is depicted more fully in FIG. 6, which is an orthographic view of a clip 14 and holder 15. In FIG. 6 the clip 14 which is attached to the end of the tape 12 is shown as a metal "tee" structure. This "tee" structure which is clip 14 comprises a flat face 90 and an attached perpendicular to a leg 91. The face 90 has an aligning knob 92. The holder 15 comprises a metal jacket 94 shaped to slide onto and around the face portion 90 of the clip 14. An aligning recess 96, in the form of a hole or dimple, aligns with the aligning knob 92 when the holder 15 is attached to the clip 14. In further detail, the holder 15 also comprises a strap 100 and a latch 102, each attached to an opposite end of the metal jacket. The strap 100 is flexible and has a non-slip rubberized backing 104 on the inside surface, as well as a section of Velcro (™) loop material on the free end of the strap. The latch 102 consists of a flexible tag made of Velcro (™) hook material. When a cutting or marking tool is placed in the holder, the strap 100 is pulled around the tool and attached to the latch 102, thereby holding the cutting or marking tool in place at the end of the tape 12.

LIST OF REFERENCE NUMBERS

1 Measuring, marking and cutting tool
2 Straight edge
4 Workpiece
6 Housing
8 Tape cartridge
10 Guide
12 Tape
14 Clip
16 Pencil
20 Body
22 Foot
24 Guide retaining pin
30 Graduations
40 Guide retaining pin slot
42 Brake pin
50 Box
52 Cover
56 Reference marks
60 Brake pin access hole
62 Axle attachment point
64 Axle
66 Drum
68 Spring coil cavity
70 Tape spool
72 Detentes
74 Drum spring slot
76 Spring
78 Axle spring slot
80 Brake return spring
82 Spring retaining head
90 Face portion
91 Leg
92 Aligning knob
94 Jacket
96 Aligning recess
100 Strap
102 Latch
104 Backing
105

While the preferred embodiments of the invention have been shown, illustrated, and described, it will be apparent to those skilled in this field that various modifications may be made in these embodiments without departing from the spirit of the present invention, For that reason, the scope of the invention is set forth in the following claims.

I claim:

1. A measuring, marking, and cutting tool comprising:

an extensible tape measure, said extensible tape measure comprising an elongated handle with a rigid, fixed, straight tail piece along a straight length of said handle, and said handle having a recess for accommodating a tape cartridge, and said tape measure including a removable and replaceable tape cartridge containing a flexible, reversible measuring tape;

a guiding means for guiding the tape measure along the edge of a work piece wherein said guiding means comprises a squared, hollow "tee" guide that is pivotally affixed around said rigid, fixed, straight tail piece along a straight length of said handle, and wherein said pivoting motion causes said guide to contact and engage said locking means;

a locking means housed within said elongated handle and in communication with both said guiding means and said measuring tape said locking means for temporarily securing said flexible, reversible measuring tape at any determined position along the measuring tape; and an attachments means located on the retracted distal end of said flexible, reversible measuring tape for attaching a measuring or marking device to the distal end of said measuring tape.

2. A measuring, marking, and cutting tool as set forth in claim 1, wherein said tape cartridge houses said flexible, reversible tape wound into therein, and said handle has an opening formed therein through which the free end of said tape protrudes on the outside of said handle.

3. A measuring, marking, and cutting tool comprising:

an extensible tape measure, said extensible tape measure comprising an elongated handle with a rigid, fixed, straight tail piece along a straight length of said handle, and said handle having a recess for accommodating a tape cartridge, and said tape measure including a removable and replaceable tape cartridge containing a flexible, reversible measuring tape;

a guiding means affixed to said rigid, fixed, straight tail piece for guiding the tape measure along the edge of a work piece;

a locking means for temporarily securing said flexible reversible measuring tape at any determined position along the measuring tape comprising a spring tensioned locking pin in contact with and engaged by said guiding means, said locking pin being contained within said rigid, fixed, straight tail piece structure of said elongated handle, and said locking pin passing through both said elongated handle and its contained tape cartridge; and an attachments means located on the retracted distal end of said flexible, reversible measuring tape for attaching a measuring or marking device to the distal end of said measuring lane.

4. A measuring, marking, and cutting tool as set forth in claim 1 or claim 3, wherein said attachment means located on the retracted distal end of said flexible, reversible measuring tape comprises a flexible, adjustable wrap-around pencil/knife holder, and said flexible, adjustable wrap-around pencil/knife holder composed of a "tee" shaped clip permanently affixed to the distal end of said measuring tape, and said clip mating to and being removable affixed to a flexible, variably adjustable holder strap device, said holder strap device comprised of two flexible straps, one said strap surface with or made of Velcro (™) loop material, and the other said strap surfaced with or made of Velcro (™) hook material.

* * * * *